US012695753B2

(12) United States Patent
Someya et al.

(10) Patent No.: US 12,695,753 B2
(45) Date of Patent: Jul. 28, 2026

(54) MANAGEMENT SERVER AND MANAGEMENT SERVER SYSTEM

(71) Applicant: SEIKO EPSON CORPORATION, Tokyo (JP)

(72) Inventors: Tomohito Someya, Shiojiri (JP); Yuichi Sugiyama, Shiojiri (JP); Tsutomu Kasai, Shimosuwa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 187 days.

(21) Appl. No.: 18/621,203

(22) Filed: Mar. 29, 2024

(65) Prior Publication Data

US 2024/0333715 A1     Oct. 3, 2024

(30) Foreign Application Priority Data

Mar. 30, 2023     (JP) ................................. 2023-055393

(51) Int. Cl.
H04L 9/40          (2022.01)
H04N 1/00          (2006.01)

(52) U.S. Cl.
CPC .............. H04L 63/10 (2013.01); H04L 63/20 (2013.01); H04N 1/00244 (2013.01)

(58) Field of Classification Search
CPC ...... H04L 63/10; H04L 63/20; H04N 1/00244
See application file for complete search history.

(56) References Cited

U.S. PATENT DOCUMENTS

| | | | | |
|---|---|---|---|---|
| 2012/0293819 A1* | 11/2012 | Doui | ..................... | H04L 63/083 |
| | | | | 358/1.13 |
| 2016/0241536 A1* | 8/2016 | Parman | .................. | G06F 21/31 |
| 2020/0076803 A1* | 3/2020 | Saito | ..................... | H04L 63/083 |
| 2022/0035581 A1 | 2/2022 | Kawasaki | | |

FOREIGN PATENT DOCUMENTS

JP          2022025667 A      2/2022

* cited by examiner

*Primary Examiner* — El Hadji M Sall
(74) *Attorney, Agent, or Firm* — CHIP LAW GROUP

(57)          ABSTRACT

There is provided a management server which includes a server communication portion communicating with a service providing server and an image forming apparatus, and a server processor. The server processor receives a first request, which is a request including identification information of the image forming apparatus, authentication information, and information about an email address, from the service providing server via the server communication portion. Further, the server processor transmits the authentication information to a terminal device, which is a destination of the email address. Further, the server processor establishes a connection between the image forming apparatus specified based on the identification information and the service providing server via the management server when there is an access including the authentication information from the terminal device.

11 Claims, 9 Drawing Sheets

Figure 8:
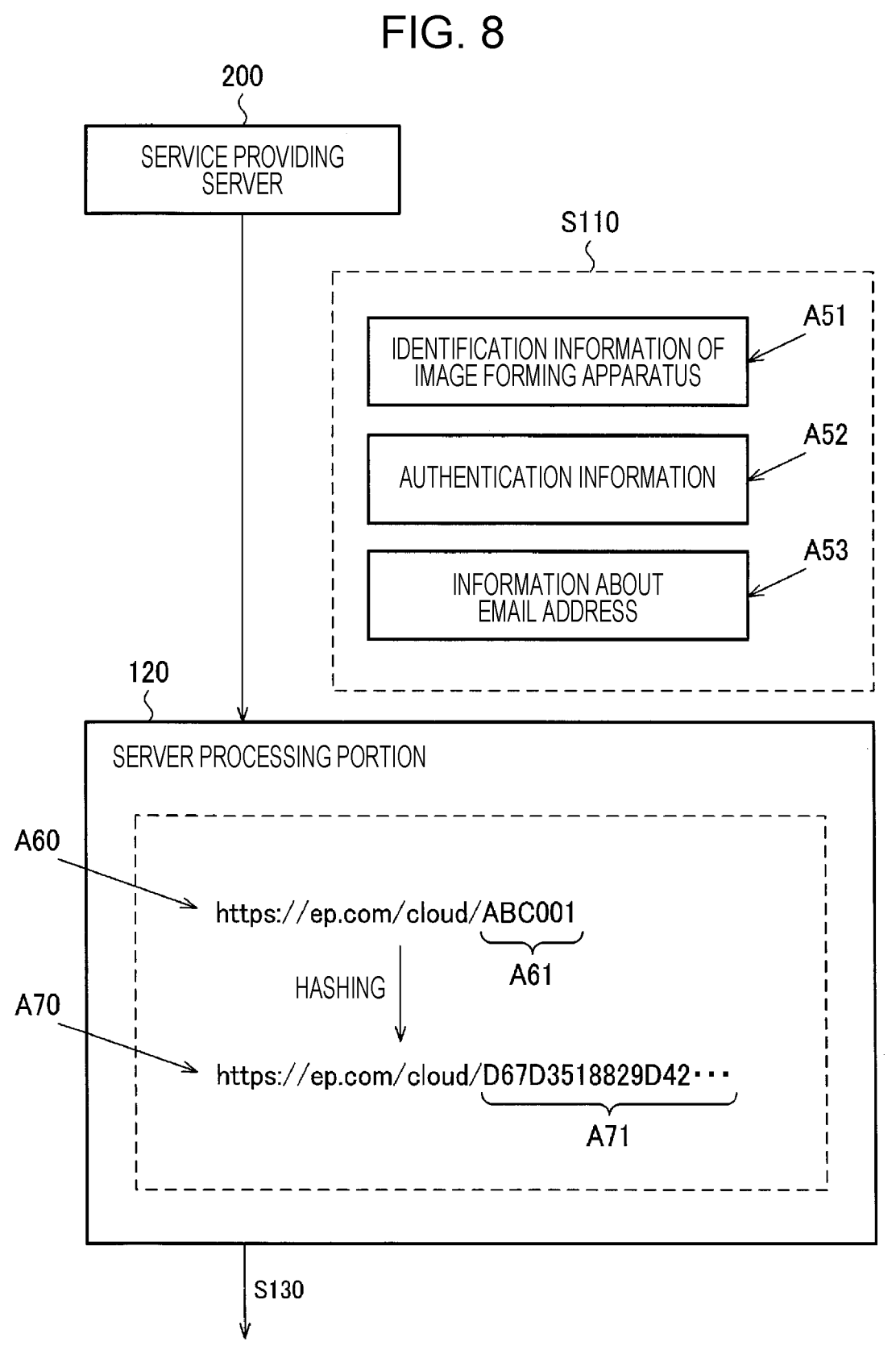

SERVICE PROVIDING
SERVER

S110

IDENTIFICATION INFORMATION OF
IMAGE FORMING APPARATUS — A51

AUTHENTICATION INFORMATION — A52

INFORMATION ABOUT
EMAIL ADDRESS — A53

120

SERVER PROCESSING PORTION

A60 https://ep.com/cloud/ABC001

⎵
A61

HASHING

A70 https://ep.com/cloud/D67D3518829D42・・・

⎵
A71

S130

MANAGEMENT SERVER AND MANAGEMENT SERVER SYSTEM

The present application is based on, and claims priority from JP Application Serial Number 2023-055393, filed Mar. 30, 2023, the disclosure of which is hereby incorporated by reference herein in its entirety.

BACKGROUND

1. Technical Field

The present disclosure relates to a management server, a management server system, and the like.

2. Related Art

In the related art, a service system using a server connected to a network is known. JP-A-2022-025667 discloses a method of registering an image forming apparatus in a service system.

In a service system according to an image forming apparatus, when the residence of a service provider and the residence of a service recipient are different, it is necessary for the service recipient to register the image forming apparatus in the service system, and a method is required to reliably exchange information necessary for registration.

SUMMARY

An aspect of the present disclosure relates to a management server including: a server communication portion communicating with a service providing server and an image forming apparatus; and a server processing portion, in which the server processing portion receives a first request, which is a request including identification information of the image forming apparatus, authentication information, and information about an email address, from the service providing server, transmits the authentication information to a terminal device, which is a destination of the email address, and establishes a connection between the image forming apparatus, which is specified based on the identification information, and the service providing server via the management server when there is an access including the authentication information from the terminal device.

Further, another aspect of the present disclosure relates to a management server system including the above described management server and the image forming apparatus specified based on the identification information.

BRIEF DESCRIPTION OF THE DRAWINGS

FIG. 8 is a diagram illustrating an example of hashing of URL information.

DESCRIPTION OF EMBODIMENTS

Hereinafter, the present embodiment will be described. It should be noted that the present embodiment described below does not unreasonably limit the content of the present disclosure described in the claims. Further, not all of the configurations described in the present embodiment are essential constituent requirements of the present disclosure.

Figure 1:
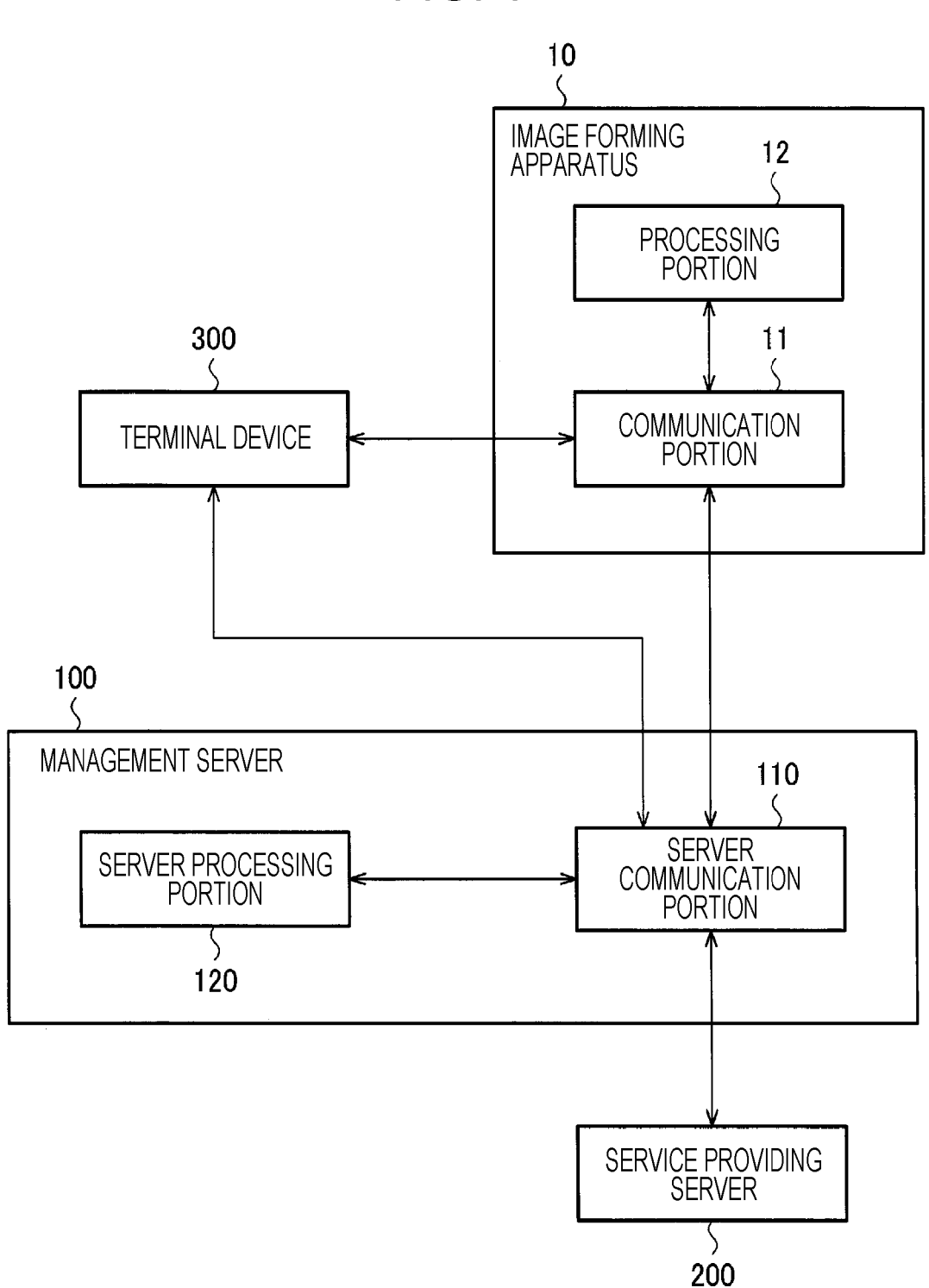
FIG. 1 is a diagram illustrating a configuration example of a management server system.

FIG. 1 is a block diagram illustrating a configuration example of a management server system 1 including a management server 100 of the present embodiment. The management server 100 of the present embodiment includes a server communication portion 110 and a server processing portion 120.

The server communication portion 110 is a communication interface that communicates with the image forming apparatus 10 and the service providing server 200 illustrated in FIG. 1 and that performs communication according to a predetermined communication standard. Further, the server communication portion 110 can also communicate with a terminal device 300, which will be described later. The server communication portion 110 can be implemented by, for example, communication hardware such as an application specific integrated circuit (ASIC) for communication or a communication processor, communication firmware, or the like. In the present embodiment, by the server processing portion 120, which will be described later, performing a communication control process such as a transmission process or a reception process of information on the server communication portion 110, the server communication portion 110 can transmit information to external apparatuses such as the image forming apparatus 10 and the service providing server 200 and can receive information from the external apparatuses. That is, the server communication portion 110 includes each of hardware, communication firmware, and the like corresponding to the desired wireless communication standard. The predetermined communication standard is wireless communication by, for example, Wi-Fi (registered trademark) or the like, and the server communication portion 110 performs wireless communication according to a predetermined connection mode of Wi-Fi. The predetermined connection mode is, for example, an infrastructure mode. That is, the management server 100 communicates with the image forming apparatus 10, the service providing server 200, and the terminal device 300 via an external access point (not illustrated). In the following description, the fact that the server processing portion 120 transmits and receives various types of data via the server communication portion 110 may be referred to as the fact that the server processing portion 120 simply transmits and receives various types of data, or the fact that the management server 100 transmits and receives various types of data.

The server processing portion 120 performs processing of each portion of the management server 100. The server processing portion 120 is configured with the following hardware. Although the hardware includes a circuit that processes digital signals, the hardware may further include a circuit that processes analog signals. For example, the hardware can consist of one or a plurality of circuit devices mounted on a circuit substrate or one or a plurality of circuit elements. The one or a plurality of circuit devices are, for example, integrated circuits (IC), field-programmable gate arrays (FPGAs), and the like. The one or a plurality of circuit elements are, for example, resistors, capacitors, and the like. Further, the server processing portion 120 is implemented by including at least one of the following processors. The server processing portion 120 includes a server storage portion 130 that stores information (not illustrated in FIG. 1) and a processor that is operated based on the information stored in the server storage portion 130. The information includes, for example, a program and various data. The processor includes the hardware. As the processor, various processors, such as a central processing unit (CPU), a graphics processing unit (GPU), and a digital signal processor (DSP), can be used. The server storage portion 130 may be a semiconductor memory such as a static random access memory (SRAM) or a dynamic random access memory (DRAM), may be a register, may be a magnetic storage device such as a hard disk drive (HDD), and may be an optical storage device such as an optical disk device. For example, the server storage portion 130 stores commands that can be read by the computer, and by executing the commands with the processor, the functions of some or all of the portions of respective portions of the management server 100 are implemented as processing. Here, the command may be a command of a command set constituting the program or may be a command instructing an operation with respect to a hardware circuit of the processor.

Although the image forming apparatus 10 of the present embodiment is, for example, a printer, the image forming apparatus 10 may be a scanner, a personal computer, a wearable device, a biometric information measuring device, a robot, a video device, a physical quantity measuring device, or the like. The printer here may be an ink jet printer, for example, and may also be, for example, a dot impact printer, a thermal transfer printer, a laser printer, or a label printer. Further, the wearable device refers to a smartwatch, an active movement tracker, or the like. Further, the biometric information measuring device refers to a pulse rate, a pedometer, or the like. Further, the video device refers to a camera, a projector, or the like. Further, the physical quantity measuring device refers to a thermometer, a weighing scale, or the like. Further, the printer referred to here includes a multifunction device. The multifunction device refers to a printer including a function other than the printer function, and the function other than the printer function may be a copy function, a fax function, a scanner function, or the like, but other functions may be also possible.

The image forming apparatus 10 according to the present embodiment includes a communication portion 11 and a processing portion 12. The communication portion 11 is a communication interface that corresponds to the predetermined communication standard similar to the server communication portion 110 of the management server 100. That is, the communication portion 11 of the present embodiment includes each of hardware, communication firmware, and the like corresponding to the predetermined communication standard. The processing portion 12 is configured with the same processor as the server processing portion 120 of the management server 100 and functions as the image forming apparatus 10 by reading various programs from a memory (not illustrated) and performing an input/output process and the like. In the following description, the fact that the processing portion 12 transmits and receives various types of data via the communication portion 11 may be referred to as the fact that the processing portion 12 simply transmits and receives various types of data, or the fact that the image forming apparatus 10 transmits and receives various types of data. Further, although FIG. 1 illustrates that one management server 100 is connected to one image forming apparatus 10, a plurality of image forming apparatuses 10 may be connected to one management server 100.

Other components can be added to the image forming apparatus 10 according to the present embodiment. The other components are, for example, a printing portion, a display portion, or the like. Further, the image forming apparatus 10 may further include an operation portion, and the operation portion may be hardware integrated with the display portion with, for example, a touch panel. Either the printing portion or the display portion may be provided.

Although the terminal device 300 is, for example, a portable information terminal such as a smartphone, the terminal device 300 may be a personal computer or the like. Although not illustrated, the terminal device 300 includes a terminal device communication portion that is a communication interface corresponding to a predetermined communication standard similar to the server communication portion 110 and the communication portion 11, and communicates with the management server 100 and the image forming apparatus 10. Similarly, the terminal device 300 includes a terminal device processing portion implemented by the same processor as the server processing portion 120 and the processing portion 12, and controls each portion of the terminal device 300. Further, the terminal device 300 may further include, for example, a terminal device storage portion, a terminal device display portion, a terminal device operation portion, and the like, and the terminal device operation portion may be hardware integrated with the terminal device display portion with, for example, a touch panel. In the following description, the fact that the terminal device processing portion transmits and receives various types of data via the terminal device communication portion may be referred to as the fact that the terminal device 300 transmits and receives various types of data. Further, in the present embodiment, it is assumed that a user of the terminal device 300 is the same person as the user of the image forming apparatus 10 or a person who can view the same view as the user of the image forming apparatus 10. The person who can view the same view as the user of the image forming apparatus 10 is, for example, a person who works at a store to which the user of the image forming apparatus 10 belongs.

The service providing server 200 transmits and receives data related to a service of the image forming apparatus 10 to the management server 100. Specifically, for example, when the image forming apparatus 10 is a receipt printer, a POS system server, a printer maintenance service server, or the like corresponds to the service providing server 200. That is, a person who manages or operates the service providing server 200 is a service provider who provides a service related to the image forming apparatus 10. On the other hand, the user who uses the image forming apparatus 10 is a service recipient who receives a service related to the image forming apparatus 10. More specifically, for example, when the service providing server 200 is a POS system server, the service provider is a developer of the POS system, and the service recipient is a salesclerk of a store that has introduced the POS system. Further, in the present embodiment, a plurality of types of service providing servers 200 can be connected to one management server 100.

Although not illustrated, the service providing server 200 includes a communication interface corresponding to a predetermined communication standard similar to the server communication portion 110, and communicates with the management server 100. Similarly, the service providing server 200 includes a processor similar to the server processing portion 120, and controls each portion of the service providing server 200. Hereinafter, the fact that the processor of the service providing server 200 transmits and receives various types of data via the communication interface of the service providing server 200 is simply referred to as the fact that the service providing server 200 transmits and receives various types of data.

For example, it is assumed that a POS system service using the image forming apparatus 10 is developed by the service provider, and the service recipient uses the POS system service. In this case, the service provider incorporates a POS system service software into the image forming apparatus 10. The service provider can provide the POS system service to a store or the like by sending the image forming apparatus 10 incorporating the POS system service software to the service recipient.

Further, in the service using the image forming apparatus 10, a sales source of the image forming apparatus 10 may provide the service provider and the service recipient with a predetermined service related to the image forming apparatus 10. For example, the predetermined service is a service or the like for promptly preparing a replacement image forming apparatus 10 by quickly detecting the fact that the image forming apparatus 10 is no longer operating normally. Alternatively, when the management server 100 is a server consisting of cloud computing, various cloud services may be included in the predetermined service. In order to perform such a predetermined service, it is necessary to enable the management server 100 to collect predetermined data for the image forming apparatus 10. Therefore, in order to start using the image forming apparatus 10, the user of the image forming apparatus 10 is required to perform a procedure of permitting the management server 100 to collect predetermined data. When a permission is obtained from the user of the image forming apparatus 10, the predetermined service becomes usable.

As described above, since the management server 100 is a server that provides a predetermined service, a client server system relationship is established among the management server 100, the service providing server 200, and the image forming apparatus 10, in which the management server 100 is set as a server and the service providing server 200 and image forming apparatus 10 are set as clients. Therefore, in the present embodiment, the image forming apparatus 10 and the service providing server 200 are not directly connected to each other, and the management server 100 functions to relay data transmission and reception between the image forming apparatus 10 and the service providing server 200.

For example, when it is desired to add an image forming apparatus 10 that is a target of the predetermined service, the server processing portion 120 performs processing of permitting an access from the corresponding image forming apparatus 10. When there are a plurality of the image forming apparatuses 10 and a plurality of the service providing servers 200 as clients, the association between each image forming apparatus 10 and each service providing server 200 is performed. As described above, in order to receive the predetermined service, it is necessary to perform a setting to connect the service providing server 200 and the image forming apparatus 10 via the management server 100.

However, as in the above-described POS system service, depending on the service provided by the service provider, the residence of the service provider and the residence of the service recipient may be different. In this case, although the user of the image forming apparatus 10 who is the service recipient needs to set up the sent image forming apparatus

10, the setting up of the image forming apparatus 10 may not be performed smoothly because of a predetermined reason. The predetermined reason is that the service provider forgets the fact that, for example, the service provider has to convey information necessary for setting up the image forming apparatus 10 to the user of the image forming apparatus 10 over the telephone or the like. Alternatively, one possible method can be considered in which the information necessary for setting up the image forming apparatus 10 is written on a paper sheet, and the paper sheet is packaged with the image forming apparatus 10 and sent to the user of the image forming apparatus 10, but when the user of the image forming apparatus 10 loses the paper, the image forming apparatus 10 may not be set up smoothly. As described above, the convenience of the service using the image forming apparatus 10 is not sufficient. The method of the present embodiment solves such a problem and improves the convenience of the service using the image forming apparatus 10. In the following description, the user of the image forming apparatus 10 and the terminal device 300 who is the service recipient may be simply referred to as a "user".

Figure 2:
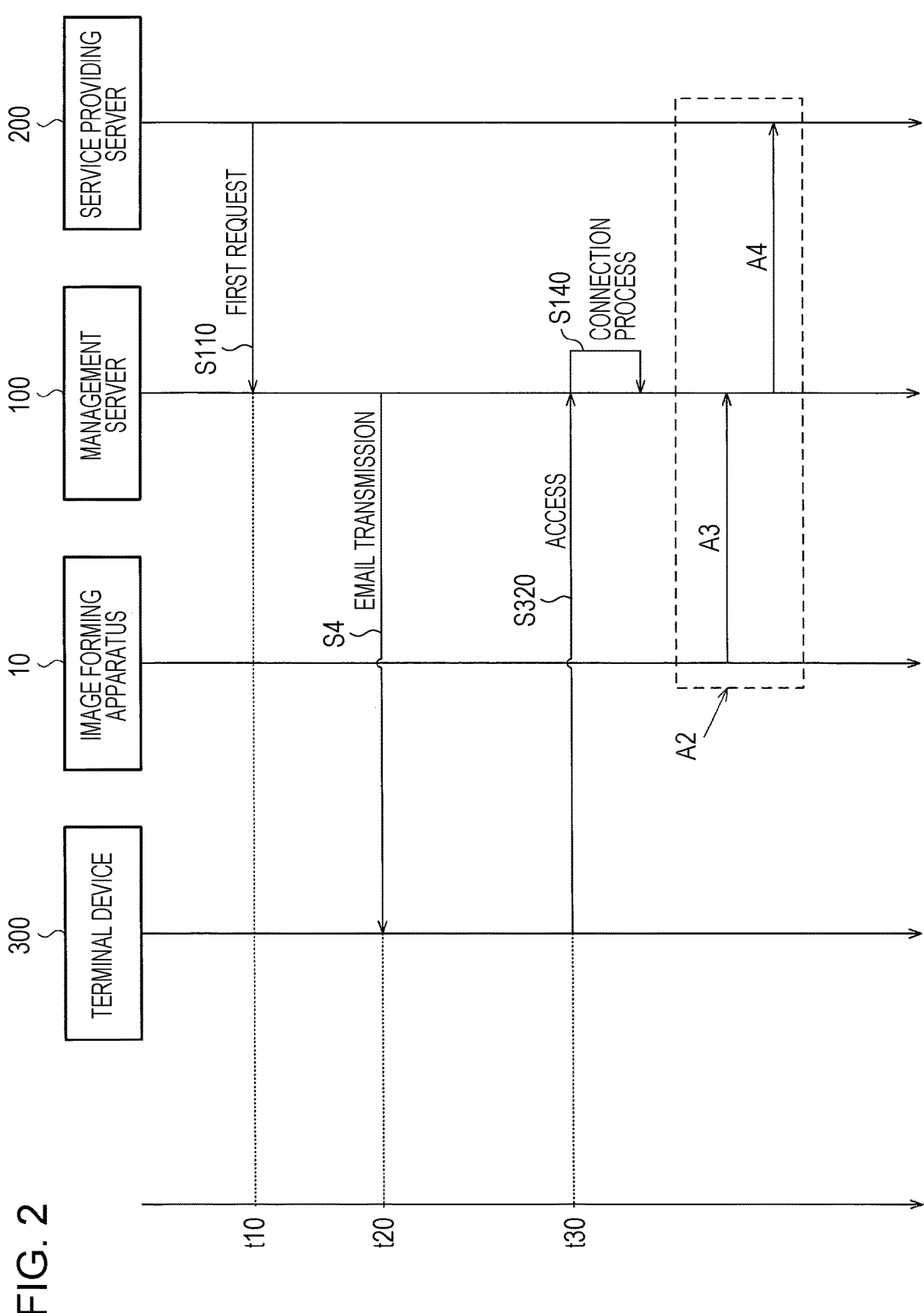
FIG. 2 is a diagram illustrating an example of a flow of processing of the present embodiment.

FIG. 2 is a diagram illustrating an example of a flow of processing according to the method of the present embodiment. In FIG. 2, although a downward arrow indicates a time axis, the length of the arrow does not indicate the specific length of time. Further, although not illustrated, it is assumed that the communication between the management server 100 and the service providing server 200 is already established. For example, a client server system may already be established between the management server 100 and the service providing server 200, or a predetermined session may be established between the management server 100 and the service providing server 200. The predetermined session is established by, for example, providing predetermined connection software to the service provider by a manufacturer of the image forming apparatus 10.

The server processing portion 120 receives a first request from the service providing server 200 at time t10 (step S110). Identification information of the image forming apparatus 10, authentication information, and information about an email address are included in a packet according to the first request. The identification information of the image forming apparatus 10 is, for example, a serial number of the image forming apparatus 10. The authentication information is information used to determine whether or not an access described in step S320, which will be described later, is an access that is based on the terminal device 300 owned by the user. Specifically, the information about the email address is information about an email address of the user of the image forming apparatus 10 who is the service recipient. The information about the email address is transmitted to the service provider by the service recipient who uses the image forming apparatus 10 according to the identification information at the time of a contract for a service related to the service providing server 200, for example. That is, the information about the email address is information related to the identification information of the image forming apparatus 10.

Thereafter, the server processing portion 120 transmits an email based on the email address included in the packet of the first request at time t20 as predetermined time (step S4). Although step S4 is shown as transmitting email data directly from the management server 100 to the terminal device 300, the present embodiment is not limited to this, and it may be assumed that step S4 is being executed when the user can view the email according to step S4 by using the software installed on the terminal device 300. The authentication information included in the packet of the first request (step S110) is described in the email according to step S4.

Thereafter, at time t30, an access to the management server 100 from the terminal device 300 is performed by using a method described later (step S320). The authentication information, which is described in the email according to step S130, is included in the access. As a result, the server processing portion 120 determines that the access according to step S320 is the access by the user transmitted in step S130, and the user has permitted the predetermined service.

Thereafter, the server processing portion 120 performs a connection process (step S140). Although the details of step S140 will be described later with reference to FIG. 9, the server processing portion 120 connects the service providing server 200 and the image forming apparatus 10 via the management server 100 by checking permission from the user. That is, the client server system is established within a range indicated by A2. For example, the management server 100 collects data, which is indicated in A3, from the image forming apparatus 10. Thereafter, as indicated by A4, the management server 100 transmits the data to the service providing server 200.

As described above, the management server 100 of the present embodiment includes the server communication portion 110, which communicates with the service providing server 200 and the image forming apparatus 10, and the server processing portion 120. The server processing portion 120 receives the first request, which is a request including the identification information of the image forming apparatus 10, the authentication information, and the information about the email address, from the service providing server 200 via the server communication portion 110. Further, the server processing portion 120 transmits the authentication information to the terminal device 300, which is a destination of the email address. Further, the server processing portion 120 establishes a connection between the image forming apparatus 10 specified based on the identification information and the service providing server 200 via the management server 100 when there is an access including the authentication information from the terminal device 300.

As described above, since the management server 100 of the present embodiment includes the server communication portion 110, the management server 100 can communicate with the image forming apparatus 10, the service providing server 200, and the terminal device 300, and can receive the first request from the service providing server 200. Since the management server 100 includes the server processing portion 120, the management server 100 can transmit the authentication information to the terminal device 300 based on the email address included in the packet of the first request received from the service providing server 200. Further, since the server processing portion 120 determines that there is an access including the authentication information from the terminal device 300, which is a transmission destination of the email address, the server processing portion 120 can connect, via the management server 100, the service providing server 200, in which the first request is transmitted, and the image forming apparatus 10, which is specified based on the identification information associated with the email address. As a result, it is possible to reliably connect the desired service providing server 200 and the desired image forming apparatus 10 via the management server 100.

Heretofore, a method of transmitting an email address to the terminal device 300 by the management server 100 has not been proposed for connecting the service providing server 200, in which a request is transmitted, and the desired image forming apparatus 10 via the management server 100, in which the request is received. As described above, when the service provider related to the service providing server 200 adopts the method of transmitting the authentication information to the user of the image forming apparatus 10 who is the service recipient, the desired connection may not be possible because the service provider forgets to transmit the authentication information or the user loses the authentication information. In this regard, since the user can perform an access including the authentication information by using the terminal device 300, which is capable of displaying emails received from the management server 100, with respect to the management server 100, the authentication information can be reliably transmitted to the user. As a result, the desired connection can be reliably performed.

Further, the method of the present embodiment may be implemented as the management server system 1. That is, the management server system 1 of the present embodiment includes the management server 100 described above and the image forming apparatus 10 specified based on the identification information. In this way, the same effect as described above can be obtained.

Figure 3:
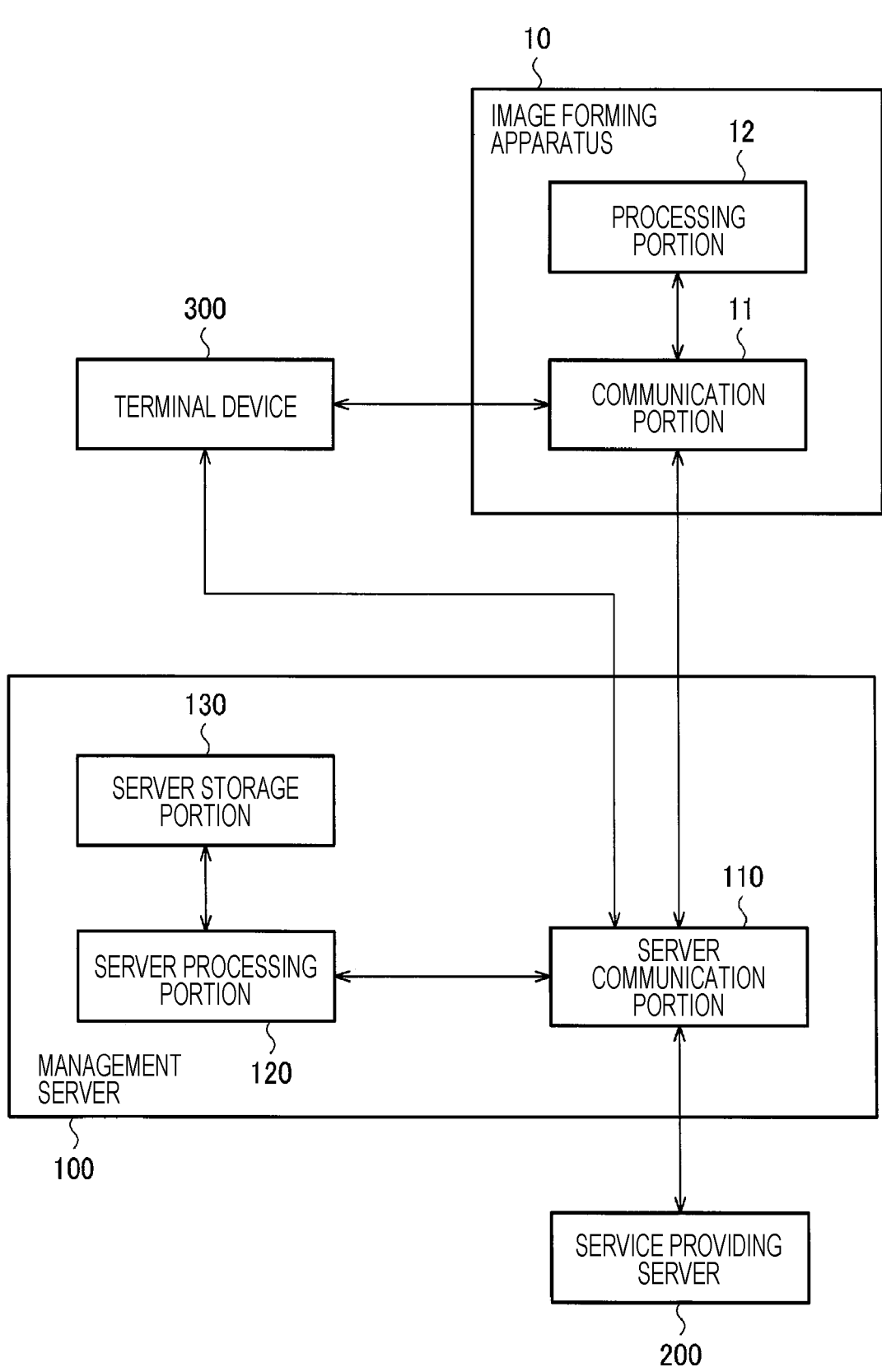
FIG. 3 is a diagram illustrating another configuration example of the management server system.

The method of the present embodiment is not limited to the above, and various modification embodiments such as adding features can be performed. For example, the management server system 1 of the present embodiment may be as in the configuration example in FIG. 3 in more detail. FIG. 3 differs from the configuration example in FIG. 1 in that the management server 100 further includes a server storage portion 130. In FIG. 3, configurations other than the server storage portion 130 are the same as those in FIG. 1, and thus the description thereof is omitted.

Figure 4:
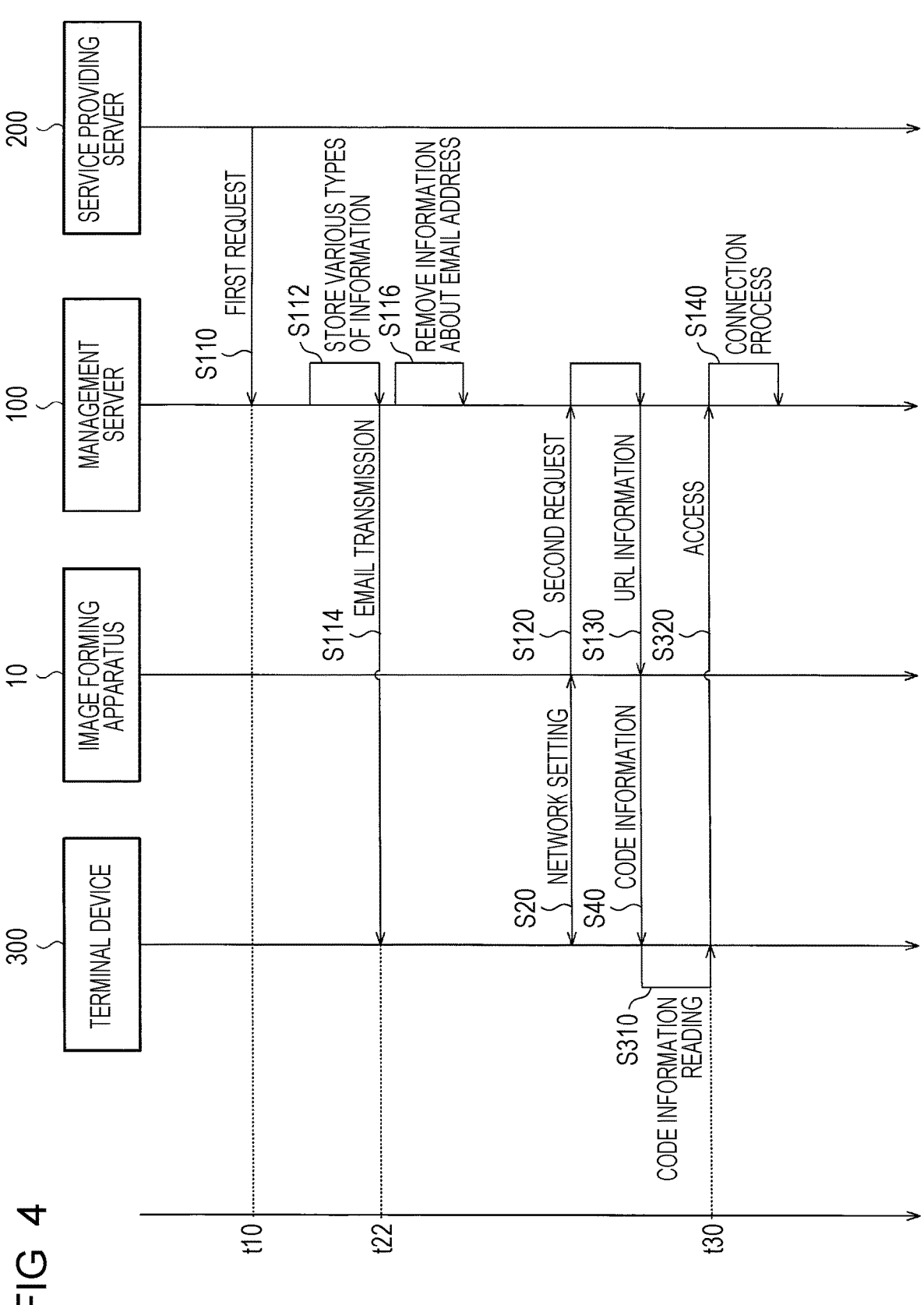
FIG. 4 is a diagram illustrating another example of a flow of processing of the present embodiment.

Further, an example of the flow of the processing according to the method of the present embodiment may be as in the example in FIG. 4 in more detail. The example illustrated in FIG. 4 is an example in which the above-described predetermined time corresponds to time t22. Note that in FIG. 4, descriptions of processes similar to those in FIG. 2 will be omitted as appropriate.

Similar to FIG. 2, the server processing portion 120 receives the first request at the time t10 (step S110). The server processing portion 120 analyzes the packet of the first request and stores the identification information of the image forming apparatus 10, the authentication information, and the information about the email address, which are included in the packet of the first request, in the server storage portion 130 (step S112). In the description of step S112 in FIG. 4, the identification information of the image forming apparatus 10, the authentication information, and the information about the email address are simply described as "various types of information".

Thereafter, the server processing portion 120 performs the above-described step S112 and transmits the email based on the information about the email address at the time t22 (step S114). Step S114 in FIG. 4 is the same process as step S4 in FIG. 2. That is, the server processing portion 120 transmits the email including the authentication information received in step S110 to the destination of the email address received in step S110. Further, the server processing portion 120 removes the information about the email address from the server storage portion 130 after step S114 is performed. That is, in the example illustrated in FIG. 4, the method of the present embodiment is implemented such that the time during when the information about the email address is stored in the management server 100 is minimized. As described above, in the management server 100 of the present embodiment, the management server 100 further includes the server storage portion 130. Further, the server processing portion 120 stores the identification information of the image forming apparatus 10, the authentication information, and the information about the email address, which are received from the service providing server 200, in the server storage portion 130 (step S112). Further, when the first request is received, the server storage portion 130 transmits the authentication information to the terminal device 300, which is the destination of the email address (step S114). Further, the server processing portion 120 removes the information about the email address from the server storage portion 130 at the time t22 after the authentication information is transmitted to the terminal device 300 (step S116). By doing so, it is possible to reliably connect the service providing server 200 and the image forming apparatus 10 via the management server 100 while minimizing the time when the information about the email address is stored in the management server 100. Since the information about the email address is personal information, when the server storage portion 130 stores the information about the email address for a long time, the management burden on the management server 100 is increased. In this regard, by applying the method of the present embodiment, it is possible to prevent the management burden of the management server 100 from excessively increasing.

Thereafter, the user performs a network setting on the image forming apparatus 10 (step S20). Although step S20 in FIG. 2 is shown such that the image forming apparatus 10 and the terminal device 300 are connected for the convenience of description, the image forming apparatus 10 can also be connected to an external apparatus other than the terminal device 300. For example, as described above, the service provider sends the image forming apparatus 10 to the destination of the user in a packed state. For example, the user establishes communication with the unpacked image forming apparatus 10 with, for example, an infrastructure mode of Wi-Fi, thereby the user can make a state in which communication is possible between the image forming apparatus 10 and the terminal device 300 and the like.

Thereafter, the server processing portion 120 receives a second request from the image forming apparatus 10 (step S120). For example, in the image forming apparatus 10, the service provider has incorporated predetermined communication software into the image forming apparatus 10 in advance so that the software starts up when the network settings are completed. Various processes based on the predetermined communication software can also be executed on the management server 100 side. With the predetermined communication software, the processing portion 12 of the image forming apparatus 10 includes the identification information of the image forming apparatus 10 in a request packet corresponding to the predetermined communication software and transmits the request packet to the management server 100.

The server processing portion 120 analyzes the request packet according to the second request and transmits URL information to the image forming apparatus 10 specified based on the identification information included in the request packet (step S130). The predetermined communication software may be started, for example, at time when the user performs a predetermined operation on an operation portion (not illustrated) of the image forming apparatus 10, other than the time when the network setting is completed.

The processing portion 12 outputs code information based on the URL information received from the management server 100 in step S130 (step S40). For example, the processing portion 12 functions as software for creating the code information from the URL information. The code information may be, for example, a one-dimensional code or a two-dimensional code. The two-dimensional code is a display type code that has information in the horizontal and vertical directions, for example, unlike a one-dimensional code that only has information in the horizontal direction. Further, the type of the two-dimensional code of the present embodiment may be a stack type or a matrix type, and is not particularly limited, and for example, a QR code (registered trademark) can be adopted.

Figure 5:
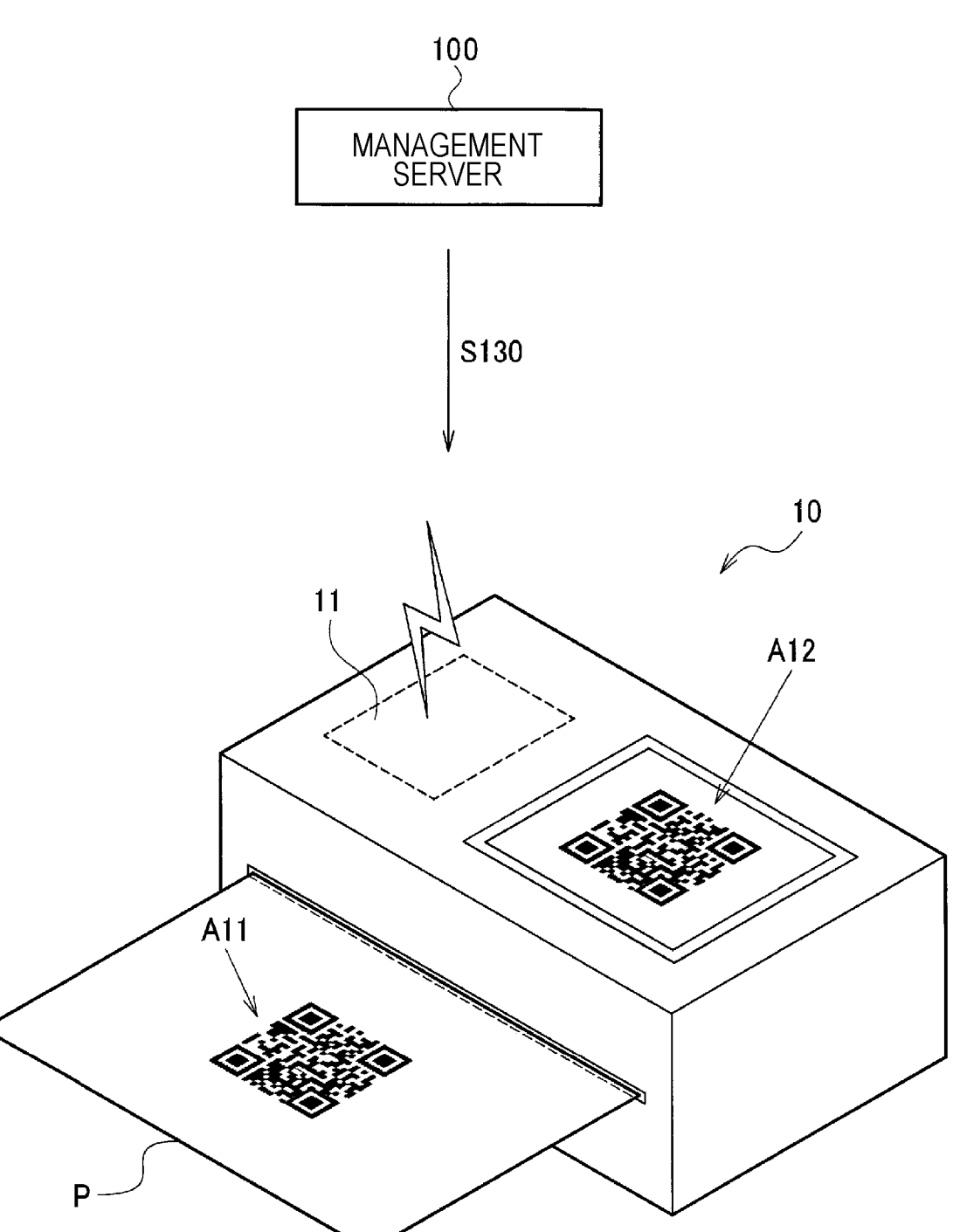
FIG. 5 is a diagram illustrating an example of displaying or printing code information.

Although step S40 shows an arrow pointing from the image forming apparatus 10 to the terminal device 300 for convenience, the code information may not need to be directly transmitted from the image forming apparatus 10 to the terminal device 300. For example, the processing portion 12 may implement step S40 by performing processing of displaying or printing the code information. More specifically, for example, as indicated by A11 in FIG. 5, a printing medium P on which the two-dimensional code is printed is ejected from the printing portion, and the two-dimensional code indicated by A12 is displayed on the display portion. The two-dimensional code indicated by A11 and the two-dimensional code indicated by A12 are the same two-dimensional code. Thereafter, step S40 can be implemented when the user reads any two-dimensional code by using a terminal device reading portion. Although FIG. 3 illustrates that the image forming apparatus 10 includes both the display portion and the printing portion, it is sufficient to have either the display portion or the printing portion, which may be determined as appropriate depending on the type of image forming apparatus 10. For example, when the image forming apparatus 10 is a receipt printer, it is sufficient that the printing medium P on which the two-dimensional code indicated by A11 is printed can be ejected.

Figure 6:
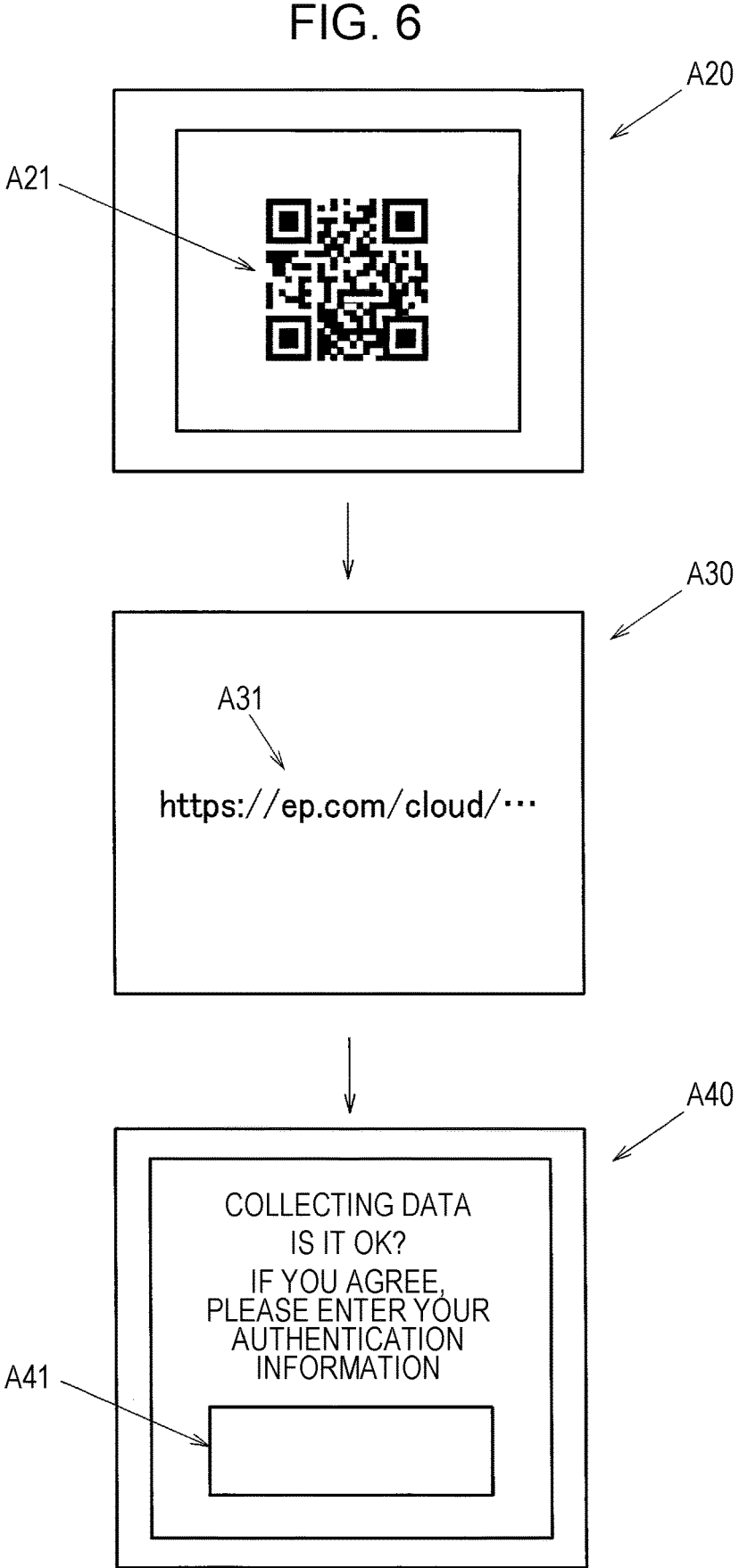
FIG. 6 is a diagram illustrating an example of a screen of a terminal device that reads the code information.

Returning to FIG. 4, the description of the flow of the processing will be continued. The terminal device 300 reads the code information output in step S40 (step S310). More specifically, step S310 can be implemented when the user operates a terminal device image capturing portion (not illustrated) included in the terminal device 300 and images the code information. For example, an image of the two-dimensional code indicated by A21 is displayed on the terminal device display portion of the terminal device 300 as illustrated in an example of a screen of A20 in FIG. 6. The terminal device processing portion then controls a two-dimensional CCD scanner or the like to perform processing of restoring information based on the image of the two-dimensional code. As a result, the example of the screen of A20 is displayed, for example, as an example of a screen of A30. In the example of the screen of A30, an image including the URL information indicated by, for example, A31 is displayed. When the user performs an operation of selecting the image indicated by A30, a web page of the management server 100 is displayed as an example of a screen indicated by A40. By doing so, as illustrated in FIG. 2, the terminal device 300 performs an access (step S320) to the management server 100. That is, when the user selects an image including the URL information indicated by A31, the terminal device processing portion performs a process of requesting data of a predetermined web page from the management server 100 and performs a process of starting a web browser. The web browser performs a process of displaying the acquired page data of the web page. When the user inputs the authentication information, which is written in the email according to step S130, in an area indicated by A41, for example, on the screen indicated by A40, the management server 100 is permitted to collect predetermined data of the image forming apparatus 10. As a result, the server processing portion 120 determines that the permission is obtained from the user related to the image forming apparatus 10, to which the URL information is transmitted, and performs the connection process (step S140) of connecting the service providing server 200 and the image forming apparatus 10 via the management server 100.

As described above, in the processing according to the method of the present embodiment, more specifically, the server processing portion 120 performs step S130, and the access in step S320 is an access from the terminal device 300 that reads the code information formed by the image forming apparatus 10 based on the URL information according to step S130. That is, in the management server 100 of the present embodiment, the server processing portion 120 transmits the URL information for connecting the service providing server 200 and the image forming apparatus 10 via the management server 100 to the image forming apparatus 10 specified based on the identification information (step S130). Further, the server processing portion 120 establishes a connection between the service providing server 200 and the image forming apparatus 10 via the management server 100 when there is an access including the authentication information from the terminal device 300 that reads the code information formed by the image forming apparatus 10 based on the URL information. By doing so, the server processing portion 120 can receive an access from the terminal device 300 that reads the code information formed by the image forming apparatus 10 specified based on the identification information. As a result, the server processing portion 120 more accurately associates the service providing server 200 according to the first request with the image forming apparatus 10 specified based on the identification information and then can connect the service providing server 200 and the image forming apparatus 10 via the management server 100.

Figure 7:
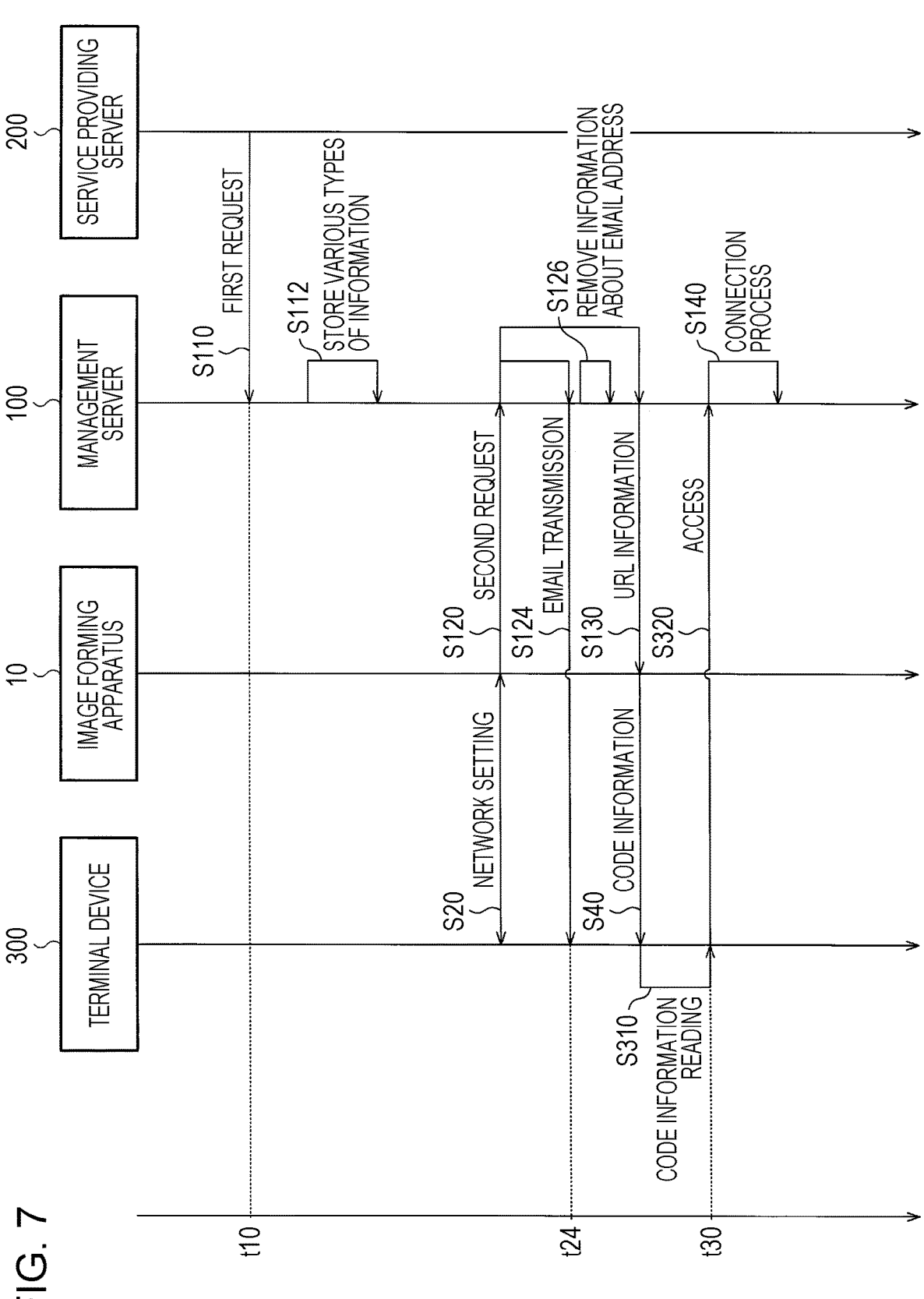
FIG. 7 is a diagram illustrating another example of a flow of processing of the present embodiment.

Further, as an example of the flow of the processing according to the method of the present embodiment, the example illustrated in FIG. 7 may be used. FIG. 7 is an example in which the predetermined time is set as time t24. In FIG. 7, parts that are different from those in FIG. 4 will be mainly described, and descriptions of processing similar to those in FIGS. 2 and 4 will be omitted as appropriate. The server processing portion 120 performs step S112 after the first request is received at the time t10 (step S110). The server processing portion 120 does not perform step S114 and step S116 shown in FIG. 4. Thereafter, the network setting (step S20) is performed in the same manner as in FIG. 4.

The server processing portion 120 transmits the email (step S124) based on the information about the email address at the time t24 which is time after the reception of the second request (step S120). That is, step S124 in FIG. 7 is a process corresponding to step S4 in FIG. 2 and step S114 in FIG. 4. Thereafter, the server processing portion 120 performs a process (step S126) of deleting the information about the email address. That is, step S126 in FIG. 7 is a process corresponding to step S116 in FIG. 4.

Although FIG. 7 illustrates that step S130 is performed at later time than step S124, when it is safe to assume that both step S124 and step S130 are performed at substantially the same time as the time t24, step S130 may be performed at earlier time than step S124. As described above, the management server 100 of the present embodiment further includes the server storage portion 130. Further, the server processing portion 120 stores the identification information of the image forming apparatus 10, the authentication information, and the information about the email address, which are received from the service providing server 200, in the server storage portion 130 (step S112). Further, the server processing portion 120 transmits (step S124) the authentication information to the terminal device 300, which is the destination of the email address, when the second request, which is a request from the image forming apparatus 10 specified based on the identification information, is received (step S120) and removes the information about the email address from the server storage portion 130 (step S126) after the authentication information is transmitted to the terminal device 300. By doing so, the user can receive an email including the authentication information in accordance with the time when the image forming apparatus 10 is set up.

The predetermined time may be time other than the time t22 illustrated in FIG. 4 and the time t24 illustrated in FIG. 7. For example, although not illustrated, the server processing portion 120 may transmit the email to the destination of the email address according to the first request at time when there is an access from the terminal device 300 (step S320). In this case, for example, the user selects the screen of A30 in FIG. 6, displays the screen of A40 on the terminal device display portion, and then switches the screen of the terminal device display portion to a screen of an email software (not illustrated). The user may copy the authentication information displayed on the screen of the email software, switch the screen of the terminal device display portion to the screen of A40 in FIG. 6, and paste the copied authentication information to the area indicated by A41. As described above, in the management server 100 of the present embodiment, the management server 100 further includes the server storage portion 130. Further, the server processing portion 120 stores the identification information of the image forming apparatus 10, the authentication information, and the information about the email address, which are received from the service providing server 200, in the server storage portion 130 (step S112). Further, the server processing portion 120 establishes the connection between the service providing server 200 and the image forming apparatus 10 via the management server 100 (step S140) when there is an access including the authentication information from the terminal device 300 that reads the code information formed by the image forming apparatus 10 specified based on the identification information (step S320). Further, the server processing portion 120 removes the information about the email address from the server storage portion 130 after the authentication information is transmitted to the terminal device 300 (step S116). By doing so, the server processing portion 120 can handle the information about the email address appropriately, and can accurately associate the service providing server 200 according to the first request with the image forming apparatus 10 specified based on the identification information, and then can connect the service providing server 200 and the image forming apparatus 10 via the management server 100.

Further, the method of the present embodiment may be implemented as the management server system 1. That is, in the management server system 1 of the present embodiment, the image forming apparatus 10 further includes the communication portion 11 communicating with the management server 100, which is communicatively connected to the service providing server 200, and the processing portion 12. Further, the server processing portion 120 receives the first request, which includes the identification information of the image forming apparatus 10, the authentication information, and the information about an email address, from the service providing server 200 (step S110). Further, the server processing portion 120 transmits the authentication information to the terminal device 300, which is the destination of the email address, at the predetermined time (step S114, step S124, and the like). Further, the server processing portion 120 transmits the URL information for connecting the service providing server 200 and the image forming apparatus 10 via the management server 100 to the image forming apparatus 10 (step S130). Further, when the URL information is received from the management server 100, the processing portion 12 prints or displays the code information including the URL information (step S40). Further, the server processing portion 120 establishes a connection between the service providing server 200 and the image forming apparatus 10 via the management server 100 when there is an access including the authentication information from the terminal device 300 that reads the code information (step S140). By doing so, the management server system 1 can be built in which the information about the email address can be appropriately handled, and the service providing server 200 according to the first request can be accurately associated with the image forming apparatus 10 specified based on the identification information, and then the service providing server 200 and the image forming apparatus 10 can be connected via the management server 100.

Next, step S130 will be described in more detail with reference to FIG. 8. In step S110, the request packet according to the first request includes the identification information of the image forming apparatus 10 indicated by A51, the authentication information indicated by A52, and the information about the email address indicated by A53 in FIG. 8. Hereinafter, the description will be made on the assumption that the identification information of the A51 is "ABC001".

In the present embodiment, the URL information according to step S130 may include a hash value. For example, the server processing portion 120 performs a process of converting the URL information indicated by A60 into the URL information indicated by A70 by using the following method. The URL information indicated by A60 includes path information indicated by A61. The path information indicated by A61 is based on the identification information of the image forming apparatus 10. That is, the server processing portion 120 associates the identification information of the image forming apparatus 10, which is received in step S200, with a predetermined area of the server storage portion 130. The server processing portion 120 converts the path information indicated by A61 into path information indicated by A71 by performing hashing with a predetermined hash function and generates the URL information indicated by A70 based on the path information.

When the server processing portion 120 performs the above process, although the path information, which is included in the URL information, is changed, a host name is not changed. Therefore, in step S320, an IP address acquired from a DNS server by the terminal device processing portion is not changed. In other words, regardless of whether the URL information of A60 or the URL information of A70 is used, the terminal device 300 can access the same management server 100 through step S320 described later.

Further, the hash value indicated by A71 may be hashed into a character string, which is obtained by combining the identification information indicated by A61 and a random number (not illustrated) generated by the server processing portion 120, by using a predetermined hash function. Further, in addition to the identification information and the random number, for example, it may be hashed into a character string, which is obtained by combining the identification information related to the service provider, the identification information of the user, and the like, by using the predetermined hash function. Although the same hash value is generated when the same identification information is hashed by using the same hash function, it is possible to generate hash values in a greater variety of ways by appropriately combining the identification information with the random number, or the like. As a result, it is more difficult for a person other than the user to predict the hash value.

Further, for example, a table including a plurality of types of character strings corresponding to the hash value indicated in A71 may be stored in advance in the server storage portion 130. In step S130, the server processing portion 120 may randomly select one character string from the table and associate the selected character string, the identification information of the image forming apparatus 10, the address of the web page, or the like. Therefore, in the management server 100 of the present embodiment, the server processing portion 120 transmits the URL information including the hash value to the image forming apparatus 10. By doing so, the server processing portion 120 can transmit the URL information, which is difficult to predict by a person other than the user, to the image forming apparatus 10. For example, since the identification information of the image forming apparatus 10 indicated by A61 is a character string that can be predicted, there is a possibility that the URL information indicated by A60 is also predicted by a person other than the user. In this regard, by applying the method of the present embodiment, it is possible to transmit the URL information including the hash value indicated by A71 to the image forming apparatus 10. As a result, it is possible to further reduce the possibility that the URL information is predicted by a person other than the user. As a result, as will be described later, it is possible to further reduce the possibility that access to the management server 100 from the terminal device 300 owned by a person other than the user is permitted.

Figure 9:
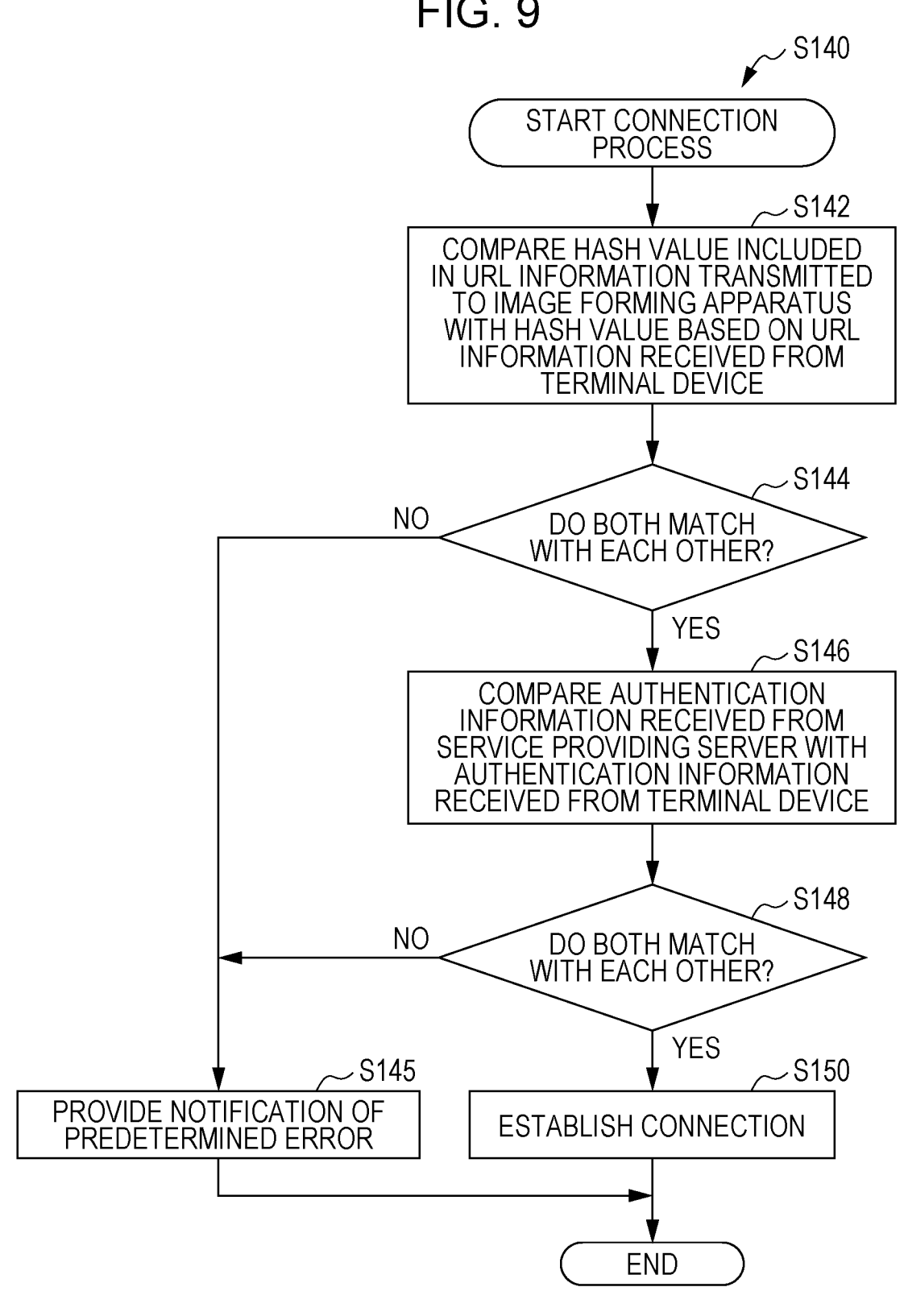
FIG. 9 is a flowchart illustrating an example of processing of a connection process.

The connection process (step S140) will be described in detail with reference to FIG. 9. First, the server processing portion 120 compares the hash value included in the URL information transmitted to the image forming apparatus 10 with the hash value included in the URL information based on the access from the terminal device 300 (Step S142). By doing so, it is possible to further reduce the possibility that the server processing portion 120 permits an access based on the terminal device 300 owned by a person other than the user. When a person other than the user predicts the URL information and accesses the management server 100, the possibility that the hash value according to the URL information is predicted is extremely low.

The server processing portion 120 provides a notification of a predetermined error (step S145) when the hash value included in the URL information transmitted to the image forming apparatus 10 and the hash value included in the URL information based on the access from the terminal device 300 do not match with each other (NO in step S144). By doing so, the management server system 1 can be built in which prompt notification is provided that an access based on a person other than the user has occurred. Although step S145 is a process of displaying an error on the terminal device display portion, step S145 is not limited to this, and for example, may be a process of notifying the manufacturer, service provider, user, or the like of the image forming apparatus 10 of the occurrence of an access from a person other than the user by email or the like, which is determined as appropriate. In the description of step S144 in FIG. 9, the hash value included in the URL information transmitted to the image forming apparatus 10 and the hash value included in the URL information based on the access from the terminal device 300 are referred to as "both" for convenience.

The server processing portion 120 may not receive a re-access from the terminal device 300 for a predetermined period when the hash value included in the URL information transmitted to the image forming apparatus 10 and the hash value included in the URL information based on the access from the terminal device 300 do not match with each other (NO in step S144). By doing so, the management server system 1 can be built in which an access from the terminal device 300 that is likely to be owned by a person other than the user is not received. Further, there is no limit to the predetermined period, which may be an indefinite period. In other words, the server processing portion 120 may reject the re-access of the terminal device 300, which is related to the process for which it is determined to be NO in step S144, indefinitely thereafter.

On the other hand, the server processing portion 120 compares the authentication information received from the service providing server 200 with the authentication information received from the terminal device 300 (step S146) when the hash value included in the URL information transmitted to the image forming apparatus 10 and the hash value included in the URL information based on the access from the terminal device 300 match with each other (YES in step S144). For example, the server processing portion 120 compares the authentication information stored in step S112 described above with the authentication information transmitted from the terminal device 300 by being input on the screen of A41 in FIG. 6.

The server processing portion 120 establishes a connection (step S150) when it is determined that the authentication information received from the service providing server 200 and the authentication information received from the terminal device 300 match with each other (YES in step S148). In the description of step S148 in FIG. 7, the authentication information received from the service providing server 200 and the authentication information received from the terminal device 300 are referred to as "both" for convenience. In step S150, the server processing portion 120 connects the service providing server 200 according to step S110 and the image forming apparatus 10 according to step S130 via the management server 100. By doing so, it is possible to more reliably prevent the service providing server 200 and the image forming apparatus 10 from being connected to each other via the management server 100 based on an access from a person other than the user.

On the other hand, the server processing portion 120 provides a notification of the predetermined error (step S145) when it is determined that the authentication information received from the service providing server 200 and the authentication information received from the terminal device 300 do not match with each other (NO in step S148). For example, the server processing portion 120 transmits, to the terminal device 300, a command or the like for displaying a web page including a display in which the authentication information is not correct.

Further, although not illustrated in the flowchart, the server processing portion 120 may not receive the access, for example, when there is an access in step S320 after a certain period of time has elapsed from the time when step S130 is performed. For example, although there is a case where the code information is printed on the printing medium P in step S40, when the printing medium P is taken away by a person other than the user, there is a possibility that step S320 is performed by the terminal device 300 of the person other than the user. In this regard, by providing a validity period in the code information issued in step S40, it is possible to prevent an unintended access from the terminal device 300 owned by a person other than the user.

As described above, the management server of the present embodiment includes the server communication portion, which communicates with the service providing server and the image forming apparatus, and the server processing portion. The server processing portion receives the first request, which is a request including the identification information of the image forming apparatus, the authentication information, and the information about the email address, from the service providing server. Further, the server processing portion transmits the authentication information to the terminal device, which is a destination of the email address. Further, the server processing portion establishes a connection between the image forming apparatus specified based on the identification information and the service providing server via the management server when there is an access including the authentication information from the terminal device.

By doing so, since the server processing portion determines that there is an access including the authentication information from the terminal device, which is a transmission destination of the email address, the server processing portion can connect, via the management server, the service providing server, in which the first request is transmitted, and the image forming apparatus, which is specified based on the identification information associated with the email address. As a result, it is possible to reliably connect the desired service providing server and the desired image forming apparatus via the management server.

Further, the server processing portion may transmit the URL information for connecting the service providing server and the image forming apparatus via the management server to the image forming apparatus specified based on the identification information. Further, the server processing portion may establish a connection between the service providing server and the image forming apparatus via the management server when there is an access including the authentication information from the terminal device that reads the code information formed by the image forming apparatus based on the URL information.

By doing so, the server processing portion can receive an access from the terminal device that reads the code information formed by the image forming apparatus specified based on the identification information. As a result, the server processing portion more accurately associates the service providing server according to the first request with the image forming apparatus specified based on the identification information and then can connect the service providing server and the image forming apparatus via the management server.

Further, the server processing portion may transmit the URL information including the hash value to the image forming apparatus.

By doing so, the server processing portion can transmit the URL information, which is difficult to predict by a person other than the user, to the image forming apparatus.

Further, the server processing portion may transmit the URL information including the hash value to the image forming apparatus and may compare the hash value included in the URL information transmitted to the image forming apparatus with the hash value included in the URL information based on the access from the terminal device.

By doing so, it is possible to further reduce the possibility that the server processing portion permits an access based on the terminal device owned by a person other than the user.

Further, the server processing portion may transmit the URL information including the hash value to the image forming apparatus and may provides a notification of a predetermined error when the hash value included in the URL information transmitted to the image forming apparatus and the hash value included in the URL information based on the access from the terminal device do not match with each other.

By doing so, the management server system can be built in which prompt notification is provided that an access based on a person other than the user has occurred.

Further, the server processing portion may transmit the URL information including the hash value to the image forming apparatus and may not receive a re-access from the terminal device for a predetermined period when the hash value included in the URL information transmitted to the image forming apparatus and the hash value included in the URL information based on the access from the terminal device do not match with each other.

By doing so, the management server system can be built in which an access from the terminal device that is likely to be owned by a person other than the user is not received.

Further, the management server may further include a server storage portion. Further, the server processing portion may store the identification information of the image forming apparatus, the authentication information, and the information about the email address, which are received from the service providing server, in the server storage portion. Further, the server processing portion may establish the connection between the service providing server and the image forming apparatus via the management server when there is an access including the authentication information from the terminal device that reads the code information formed by the image forming apparatus specified based on the identification information. Further, the server processing portion may remove the information about the email address from the server storage portion after the authentication information is transmitted to the terminal device.

By doing so, the server processing portion can handle the information about the email address appropriately, and can accurately associate the service providing server according to the first request with the image forming apparatus specified based on the identification information, and then can connect the service providing server and the image forming apparatus via the management server.

Further, the management server may further include a server storage portion. Further, the server processing portion may store the identification information of the image forming apparatus, the authentication information, and the information about the email address, which are received from the service providing server, in the server storage portion. Further, the server storage portion may transmit the authentication information to the terminal device, which is the destination of the email address, when the first request is received, and may remove the information about the email address from the server storage portion after the authentication information is transmitted to the terminal device.

By doing so, it is possible to reliably connect the service providing server and the image forming apparatus via the management server while minimizing the time during when the information about the email address is stored in the management server.

Further, the management server may further include a server storage portion. Further, the server processing portion may store the identification information of the image forming apparatus, the authentication information, and the information about the email address, which are received from the service providing server, in the server storage portion. Further, the server processing portion may transmit the authentication information to the terminal device, which is the destination of the email address, when the second request, which is a request from the image forming apparatus specified based on the identification information, is received and may remove the information about the email address from the server storage portion after the authentication information is transmitted to the terminal device.

By doing so, the user can receive an email including the authentication information in accordance with the time when the image forming apparatus is set up.

Further, the management server system of the present embodiment includes the management server described above and the image forming apparatus specified based on the identification information.

Further, in the management server system of the present embodiment, the image forming apparatus may further include the communication portion communicating with the management server, which is communicatively connected to the service providing server, and the processing portion. Further, the server processing portion may receive the first request, which includes the identification information of the image forming apparatus, the authentication information, and the information about an email address, from the service providing server. Further, the server processing portion may transmit the authentication information to the terminal device, which is the destination of the email address, at the predetermined time. Further, the server processing portion may transmit the URL information for connecting the service providing server and the image forming apparatus via the management server to the image forming apparatus. Further, when the URL information is received from the management server, the processing portion may print or display the code information including the URL information. Further, the server processing portion may establish a connection between the service providing server and the image forming apparatus via the management server when there is an access including the authentication information from the terminal device that reads the code information.

By doing so, the management server system can be built in which the information about the email address can be appropriately handled, and the service providing server according to the first request can be accurately associated with the image forming apparatus specified based on the identification information, and then the service providing server and the image forming apparatus can be connected via the management server.

Although the present embodiment is described in detail as described above, a person skilled in the art can easily understand that many modifications that do not substantially depart from the new matters and effects of the present embodiment are possible. Therefore, all such modification examples fall within the scope of the present disclosure. For example, a term described at least once together with a different term having a broader meaning or the same meaning in the specification or the drawings can be replaced with the different term anywhere in the specification or the drawings. All combinations of the present embodiment and modification examples also fall within the scope of the present disclosure. Further, the configuration and operation of the management server, the management server system, and the like, are not limited to those described in the present embodiment, and various modification embodiments could be made.

What is claimed is:

1. A management server comprising:

a server communication portion communicating with a service providing server and an image forming apparatus; and a server processor, wherein the server processor receives a first request, which is a request including identification information of the image forming apparatus, authentication information, and information about an email address, from the service providing server, transmits the authentication information to a terminal device, which is a destination of the email address, transmits URL information for connecting the service providing server and the image forming apparatus via the management server to the image forming apparatus specified based on the identification information, and establishes a connection between the image forming apparatus, which is specified based on the identification information, and the service providing server, wherein the connection is established via the management server when there is an access including the authentication information from the terminal device that reads code information formed by the image forming apparatus based on the URL information.

2. The management server according to claim 1, wherein the server processor transmits the URL information including a hash value to the image forming apparatus.

3. The management server according to claim 1, wherein the server processor transmits the URL information including a hash value to the image forming apparatus, and compares the hash value included in the URL information transmitted to the image forming apparatus with a hash value included in the URL information based on the access from the terminal device.

4. The management server according to claim 1, wherein the server processor transmits the URL information including a hash value to the image forming apparatus, and provides a notification of a predetermined error when the hash value included in the URL information transmitted to the image forming apparatus and a hash value included in the URL information based on the access from the terminal device do not match with each other.

5. The management server according to claim 1, wherein the server processor transmits the URL information including a hash value to the image forming apparatus, and does not receive a re-access from the terminal device for a predetermined period when the hash value included in the URL information transmitted to the image forming apparatus and a hash value included in the URL information based on the access from the terminal device do not match with each other.

6. The management server according to claim 1, further comprising:

a server storage, wherein the server processor stores the identification information of the image forming apparatus, the authentication information, and the information about the email address, which are received from the service providing server, in the server storage, establishes a connection between the service providing server and the image forming apparatus via the management server when there is an access including the authentication information from the terminal device that reads the code information formed by the image forming apparatus specified based on the identification information, and removes the information about the email address from the server storage after the authentication information is transmitted to the terminal device.

7. The management server according to claim 1, further comprising:

a server storage, wherein the server processor stores the identification information of the image forming apparatus, the authentication information, and the information about the email address, which are received from the service providing server, in the server storage, transmits the authentication information to the terminal device, which is the destination of the email address, when the first request is received, and removes the information about the email address from the server storage after the authentication information is transmitted to the terminal device.

8. The management server according to claim 1, further comprising:

a server storage, wherein the server processor stores the identification information of the image forming apparatus, the authentication information, and the information about the email address, which are received from the service providing server, in the server storage, transmits the authentication information to the terminal device, which is the destination of the email address, when a second request, which is a request from the image forming apparatus specified based on the identification information, is received, and removes the information about the email address from the server storage after the authentication information is transmitted to the terminal device.

9. A management server system comprising:

the management server according to claim 1; and the image forming apparatus specified based on the identification information.

10. The management server system according to claim 9, wherein the image forming apparatus includes a communication portion communicating with the management server that is communicatively connected to the service providing server, and a processor, wherein the server processor transmits the authentication information to the terminal device, which is the destination of the email address at a predetermined time, and the processor prints or displays the code information including the URL information when the URL information is received from the management server.

11. A management server comprising:

a server communication portion communicating with a service providing server and an image forming apparatus;

a server storage; and a server processor, wherein the server processor receives a first request, which is a request including identification information of the image forming apparatus, authentication information, and information about an email address, from the service providing server, stores the identification information of the image forming apparatus, the authentication information, and the information about the email address, which are received from the service providing server, in the server storage, transmits the authentication information to a terminal device, which is a destination of the email address, when the first request is received, removes the information about the email address from the server storage after the authentication information is transmitted to the terminal device, and establishes a connection between the image forming apparatus, which is specified based on the identification information, and the service providing server, wherein the connection is established via the management server when there is an access including the authentication information from the terminal device.

* * * * *